United States Patent
Beard et al.

(10) Patent No.: US 11,841,800 B2
(45) Date of Patent: Dec. 12, 2023

(54) APPARATUS AND METHOD FOR HANDLING STASH REQUESTS

(71) Applicant: Arm Limited, Cambridge (GB)

(72) Inventors: Jonathan Curtis Beard, Austin, TX (US); Jamshed Jalal, Austin, TX (US); Steven Douglas Krueger, Austin, TX (US); Klas Magnus Bruce, Leander, TX (US)

(73) Assignee: Arm Limited, Cambridge (GB)

(*) Notice: Subject to any disclaimer, the term of this patent is extended or adjusted under 35 U.S.C. 154(b) by 5 days.

(21) Appl. No.: 17/225,614

(22) Filed: Apr. 8, 2021

(65) Prior Publication Data
US 2022/0327057 A1  Oct. 13, 2022

(51) Int. Cl.
| | |
|---|---|
| G06F 12/08 | (2016.01) |
| G06F 12/0842 | (2016.01) |
| G06F 12/10 | (2016.01) |
| G06F 13/40 | (2006.01) |

(52) U.S. Cl.
CPC .......... *G06F 12/0842* (2013.01); *G06F 12/10* (2013.01); *G06F 13/4027* (2013.01); *G06F 2212/1024* (2013.01); *G06F 2212/608* (2013.01)

(58) Field of Classification Search
None
See application file for complete search history.

(56) References Cited

U.S. PATENT DOCUMENTS

| | | | | |
|---|---|---|---|---|
| 2010/0125677 A1* | 5/2010 | Bouvier | .............. | G06F 12/0888 710/266 |
| 2016/0350225 A1* | 12/2016 | Podaima | ................. | G06F 12/10 |
| 2019/0114262 A1* | 4/2019 | Dimond | ............... | G06F 9/4843 |

(Continued)

OTHER PUBLICATIONS

International Search Report and Written Opinion of the International Searching Authority dated May 23, 2022, 14 pages.

(Continued)

*Primary Examiner* — Tracy C Chan
(74) *Attorney, Agent, or Firm* — NIXON & VANDERHYE P.C.

(57) ABSTRACT

An apparatus and method for handling stash requests are described. The apparatus has a processing element with an associated storage structure that is used to store data for access by the processing element, and an interface for coupling the processing element to interconnect circuitry. Stash request handling circuitry is also provided that, in response to a stash request targeting the storage structure being received at the interface from the interconnect circuitry, causes a block of data associated with the stash request to be stored within the storage structure. The stash request identifies a given address that needs translating into a corresponding physical address in memory, and also identifies an address space key. Address translation circuitry is used to convert the given address identified by the stash request into the corresponding physical address by performing an address translation that is dependent on the address space key identified by the stash request. The stash request handling circuitry is then responsive to the corresponding physical address determined by the address translation circuitry to cause the block of data to be stored at a location within the storage structure associated with the physical address.

16 Claims, 4 Drawing Sheets

(56) References Cited

U.S. PATENT DOCUMENTS

| | | | | |
|---|---|---|---|---|
| 2019/0129857 A1* | 5/2019 | Shamis | ............... | G06F 12/0824 |
| 2019/0129871 A1* | 5/2019 | Carro | ................... | G06F 12/0888 |
| 2020/0371953 A1* | 11/2020 | Guo | .................... | G06F 12/1009 |
| 2021/0073130 A1* | 3/2021 | Pardo | ................... | G06F 12/0811 |
| 2021/0103493 A1* | 4/2021 | Mathewson | ........... | G11C 29/52 |

OTHER PUBLICATIONS

R. Komuravelli et al, "Stash: Have Your Scratchpad and Cache It Too" ACM SIGARCH Computer Architecture News, ACM Special Interest Group on Computer Architecture, vol. 43, No. 3S, Jun. 13, 2015, 13 pages.

A. Pellegrini et al, "The Arm Neoverse N1 Platform: Building Blocks for the Next-gen Cloud-to-Edge Infrastructure SoC" IEEE Micro, vol. 40, No. 2, Feb. 7, 2020, pp. 53-62.

\* cited by examiner

APPARATUS AND METHOD FOR HANDLING STASH REQUESTS

BACKGROUND

The present technique relates to an apparatus and method for handling stash requests.

In the data processing system, a number of components may be interconnected by interconnect circuitry, in order to allow communication between those components. The components may include a number of processing elements that can perform data processing operations, with the data processed by those processing elements being accessible in memory accessed by those processing elements via the interconnect circuitry.

In some instances, one of the processing elements may be arranged to perform a number of processing tasks on behalf of another processing element, and as a result generate data that the other processing element may subsequently require. One way to make that data available to the other processing element is for the processing element generating that data to write the data to a location in memory that is also accessible to the other processing element that subsequently requires that data. However, there can be significant latency associated with performing accesses to memory, along with significant energy consumption associated with such accesses.

In order to alleviate such issues, it is known to allow a first processing element that is generating data on behalf of a second processing element to issue a stash request via the interconnect circuitry that causes the generated data to be stored directly into a local storage structure of the second processing element, this process being referred to as a stashing operation. Such an approach thereby reduces the latency associated with the second processing element subsequently seeking to access that data, and can also reduce energy consumption by reducing the need to access main memory.

It would be desirable to provide a more flexible mechanism for performing such stashing operations.

SUMMARY

In one example arrangement, there is provided an apparatus comprising: a processing element with an associated storage structure used to store data for access by the processing element; an interface to couple the processing element to interconnect circuitry; stash request handling circuitry, responsive to a stash request targeting the storage structure being received at the interface from the interconnect circuitry, to cause a block of data associated with the stash request to be stored within the storage structure, wherein the stash request identifies a given address that needs translating into a corresponding physical address in memory, and also identifies an address space key; and address translation circuitry to convert the given address identified by the stash request into the corresponding physical address by performing an address translation that is dependent on the address space key identified by the stash request; wherein the stash request handling circuitry is responsive to the corresponding physical address determined by the address translation circuitry to cause the block of data to be stored at a location within the storage structure associated with the physical address.

In another example arrangement, there is provided a method of handling stash requests, comprising: providing a processing element with an associated storage structure used to store data for access by the processing element; coupling the processing element to interconnect circuitry; employing stash request handling circuitry, responsive to a stash request targeting the storage structure being received from the interconnect circuitry, to cause a block of data associated with the stash request to be stored within the storage structure, wherein the stash request identifies a given address that needs translating into a corresponding physical address in memory, and also identifies an address space key; employing address translation circuitry to convert the given address identified by the stash request into the corresponding physical address by performing an address translation that is dependent on the address space key identified by the stash request; and in response to the corresponding physical address being determined by the address translation circuitry, causing the block of data to be stored at a location within the storage structure associated with the physical address.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
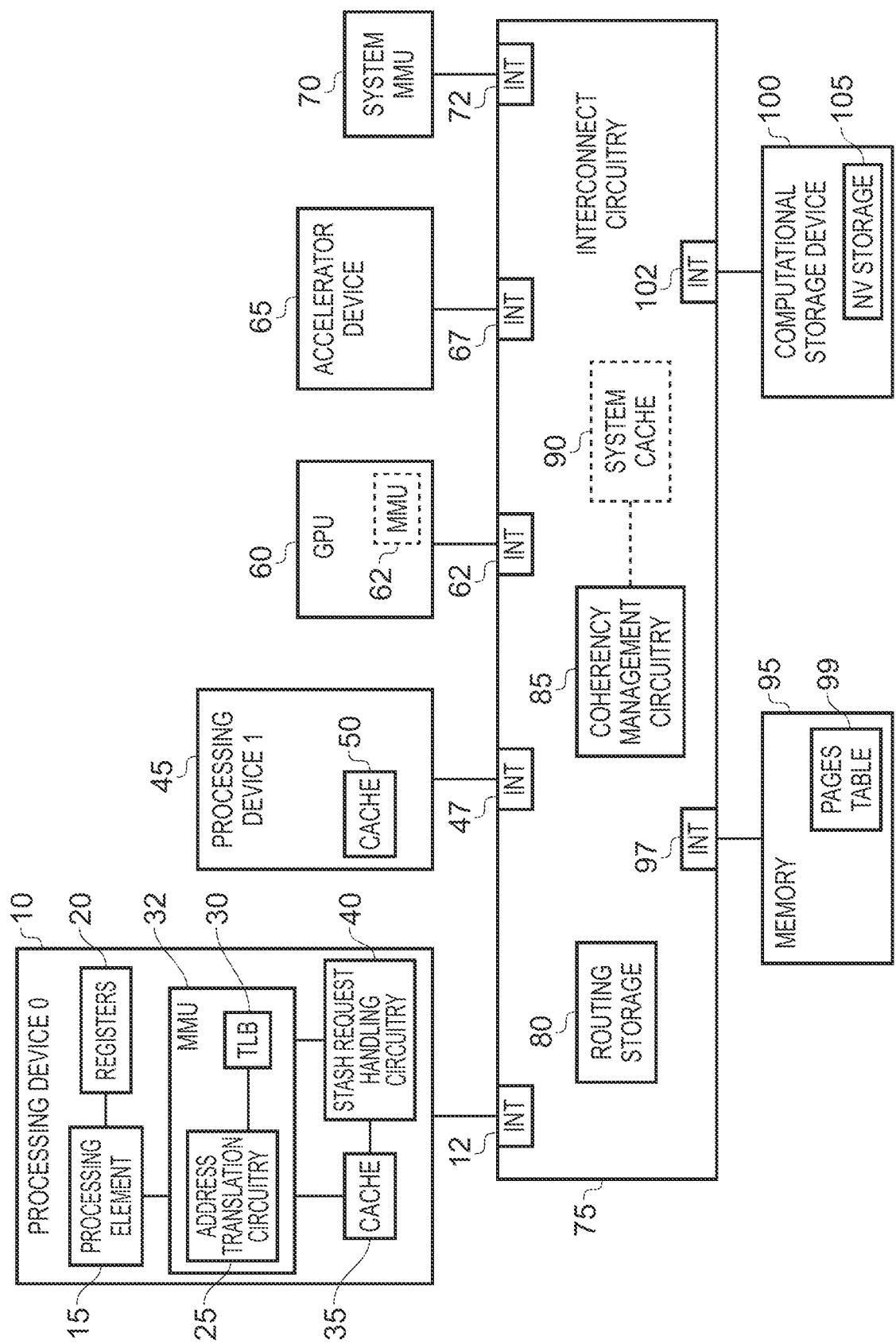
FIG. 1 is a block diagram of a system in accordance with one example arrangement.

In typical known systems, a stash request provides a physical address identifying a location in memory associated with the data to be written as a result of that stash request, and also provides a target identifier used to determine the target processing element and/or its associated storage structure into which that data is to be written. The interconnect can then route the stash request to the desired target based on the specified target identifier, so that the data associated with the stash request can then be written into a location of the target processing element's associated storage structure in dependence on the specified physical address. The associated storage structure of the target processing element can take a variety of forms, but in one example implementation may be a cache storage accessible to that target processing element.

As mentioned earlier, by allowing a first processing element that generates data for subsequent use by a second processing element to issue a stash request to cause the generated data to be directly stored within a local storage structure of the second processing element, this can significantly improve performance, reducing the latency and/or energy consumption that would otherwise be incurred due to accesses to main memory. However, such an approach based on the provision of a physical address with the stash request gives rise to some constraints, which can inhibit flexibility in the use of such stash requests. In accordance with the techniques described herein, a more flexible mechanism for performing stashing operations is provided.

In particular, in accordance with the techniques described herein an apparatus is provided with a processing element that has an associated storage structure used to store data for access by the processing element, and an interface to couple the processing element to interconnect circuitry. Further, the apparatus has stash request handling circuitry that, in response to receipt from the interconnect circuitry via the interface of a stash request targeting the storage structure of the processing element, causes a block of data associated with the stash request to be stored within the storage structure. The stash request handling circuitry can take a variety of forms. For example, it could be provided within the processing element in one example implementation, but in another example implementation may be part of the control logic used to control access to the storage structure, for example forming part of the cache access control circuitry in an example implementation where the storage structure is a cache.

In contrast to known techniques where the stash request identifies a physical address, in accordance with the techniques described herein the stash request identifies a given address that needs translating into a corresponding physical address in memory, and also identifies an address space key. The given address can take a variety of forms, but requires translation before it can be used to identify a physical address in memory associated with the data that is the subject of the stash request. In one example implementation, the given address may be a virtual address, whilst in another example implementation the given address may be an intermediate physical address.

As will be understood by those of ordinary skill in the art, different processes executing on a device may be given different virtual address spaces. For example, an operating system of the device may allocate different virtual address spaces to different processes. In a single stage address translation process, virtual addresses may be translated into physical addresses using a suitable address translation mechanism, typically such address translation mechanisms making use of one or more page tables in memory that are used to identify how virtual addresses should be translated into corresponding physical addresses. The physical address determined for a particular virtual address will depend on the particular virtual address space in question.

In some systems, rather than there being a single stage of address translation to convert a virtual address into a physical address, a multi stage address translation process may be required. For instance, in implementations where a hypervisor is used to enable multiple guest operating systems to be supported, a guest operating system controlled translation may be used to convert a virtual address into an intermediate physical address during stage one of the address translation, whilst at stage two of the address translation a hypervisor controlled translation may be used to convert the intermediate physical address into a final physical address. In such systems, the given address provided as part of the stash request could be either a virtual address or an intermediate physical address.

To enable an appropriate translation of the given address to be performed, the stash request also identifies an address space key. This address space key can take a variety of forms but serves to facilitate correct interpretation of the given address, and in particular enables the given address to be appropriately translated into the corresponding physical address in memory. By way of non-limiting example, the address space key could take the form of a process address space ID (PASID) (as standardised by protocols such as PCIe G5, CXL, GenZ, etc). However, alternatively it may comprise one or more of a virtual machine identifier (VMID) or address space identifier (ASID).

The apparatus further has address translation circuitry that is arranged to convert the given address identified by the stash request into the corresponding physical address by performing an address translation that is dependent on the address space key identified by the stash request. In particular, by providing the address space key with the stash request, this enables the address translation circuitry to determine how to interpret the given address, and in particular how to translate that given address into the correct physical address in memory. Once the corresponding physical address has been determined by the address translation circuitry, the stash request handling circuitry is then arranged to cause the block of data associated with the stash request to be stored at a location within the storage structure associated with the physical address.

Such an approach provides significantly enhanced flexibility in the use of stash requests. In particular, once a generator of stash requests has been provided with a suitable range of given addresses to use for stash requests, and an associated address space key, then it can continue to issue stash requests even if a decision is taken elsewhere in the system to alter the address mapping associated with the address space key, so as to adjust the actual physical addresses associated with the stash requests. This for example would allow the processing element that is the target of such stash requests to alter where the data provided by a stash request is stored, without any need to make any changes to the operation of the generator of those stash requests.

There are a number of ways in which the address translation circuitry may use the address space key to influence how the given address is translated into the corresponding physical address. However, in one example implementation the address translation circuitry is arranged to determine the address translation with reference to one or more page tables in memory, and the address space key is used by the address translation circuitry to identify at least one page table. For example, the address space key may be used to enable the address translation circuitry to identify a page table base address for at least one page table within memory, thereby unlocking the correct page and enabling an appropriate translation to be performed.

In one example implementation, a multi-level address translation process may be performed, and the address space key may be used to identify a base address of a first level page table. A portion of the given address may then be used to identify a particular entry within that first level page table, with that identified entry then providing a base address to a next level page table. A further portion of the given address can then be used to identify a particular entry in that page table, with that entry identifying a base address for a next level page table. This process continues until a final level page table is identified, where the entry in that final level page table identifies the physical address information.

It should be noted that such multi-level address translation can be used at each stage of address translation. Hence, whilst there may be a single stage address translation to convert a virtual address into a physical address, in other systems, as mentioned earlier, there may be a first stage address translation to convert a virtual address into an intermediate physical address, and a second stage address translation to translate an intermediate physical address into a physical address, and at either or both of those stages multi-level address translation may be used.

As mentioned earlier, whatever form the given address specified by the stash request takes, for example whether it is a virtual address or an intermediate physical address, the address space key can be used to identify the relevant page tables to be used when converting that given address into a corresponding physical address.

In one example implementation, the processing element, in at least one mode of operation, is enabled to modify the address translation performed by the address translation circuitry in dependence on the address space key, so as to alter how given addresses identified by subsequent stash requests that identify the address space key are translated into corresponding physical addresses. Hence, the processing element that is the target of the stash requests using the particular address space key can, at least in some modes of operation, alter the address translation performed in respect of the given addresses specified by those stash requests, so as to alter the mapping of those given addresses to physical addresses. The ability to alter the address translation can be limited to certain trusted execution environments if desired. For example, such ability to modify the address translation could be restricted to the hypervisor, and/or to supervisor software running on the processing element.

This provides a great deal of flexibility, as it means the processing element can alter the physical address being targeted by the stash requests without needing to seek to make any changes to the form of the stash requests issued by the generator of those stash requests. Indeed, such activity will be entirely transparent to the generator of the stash requests. When the associated storage structure is a cache, such steps could be used to alter, for example, the physical data array or storage device of the cache in which the stashed data is stored. For example, in a set associative cache, the actual set into which an item of stashed data is to be stored will depend on the physical address associated with the stashed data. In other implementations, the storage structure may not be a cache, but instead could be some local storage buffer space available to the processing element. Using the above techniques, the processing element could, for example, allocate a new local storage buffer into which subsequent stashed data is stored, with the address translation being altered so that each given address specified for a stash request will then map to a physical address within the new local storage buffer.

In one example implementation the apparatus further comprises interconnect circuitry that is used to interconnect multiple elements that are coupled to that interconnect circuitry. The multiple elements may include the earlier-mentioned processing element whose associated storage structure is being used as a target for stash requests, and may also include a generator of stash requests. The generator or stash requests can take a variety of forms, but in one example implementation such a generator of stash requests may be a hardware accelerator device that is tasked to perform certain operations on behalf of the processing element that has the associated storage structure. Such hardware accelerator devices are typically able to perform certain functions more efficiently than is possible in software running on a general purpose central processing unit (CPU), and accordingly it can be efficient to delegate certain tasks to such hardware accelerator devices. There are many different types of hardware accelerator device that could be used as a generator of stash requests, for example a graphics processing unit, a digital signal processor, a cryptographic accelerator, etc.

In one example implementation, each stash request further provides a target identifier, and the interconnect circuitry comprises routing storage that is used to associate each of the multiple elements coupled to the interconnect circuitry with an associated target identifier. The interconnect circuitry is then responsive to receipt of each stash request produced by the generator of stash requests to reference the routing storage in order to determine a target element to which that stash request is to be routed by the interconnect circuitry.

The interconnect circuitry can perform further functions in addition to merely managing the routing of communications through it between different elements. For example, the interconnect circuitry may have coherency management circuitry to maintain coherency of data accessible by the multiple elements. For instance, multiple of those elements may have cache structures that allow local copies of data to be cached by those elements, and it is important to ensure that when an element makes a request for an item of data that could be cached, that that element accesses the most up to date version of that item of data. To manage this process, the coherency management circuitry can seek to handle cacheable access requests in a manner that ensures that the most up to date version of the requested data is accessed. This may involve issuing snoop requests to one or more elements and their associated cache storage to cause certain actions to be undertaken by the recipients of those snoop requests. Such actions may for example involve invalidating a local copy of an item of data stored in a cache, and/or returning to the coherency management circuitry the copy of that item of data stored within that cache.

When stash requests are processed, then it is also important to ensure that such coherency is maintained, where the data that is the subject of the stash request is of a type that could be cached elsewhere in the system. Accordingly, the stash request handling circuitry may be arranged to trigger the coherency management circuitry to perform a coherency action in order to ensure coherency for the block of data associated with the stash request. The coherency action required could take a variety of forms, but may for example ensure that any other elements connected to the interconnect that have cached a copy of the data at the physical address associated with the stash request invalidate their copy of the data, so that the data provided in association with the stash request is then treated as the most up to date version of the data at that physical address. By causing any other cached copies to be invalidated, the coherency management circuitry can then identify in its records that the target of the stash request is the element that holds the most up to date version of that data, with that information then being useable in due course in connection with a subsequent access request issued by any of the elements that may be seeking to access the data at that physical address.

To enable the coherency management circuitry to perform such coherency actions, it will typically be necessary for the coherency management circuitry to be provided with the physical address of the data in question. Accordingly, in one example implementation, the stash request handing circuitry is arranged to trigger the coherency management circuitry to perform the coherency action once the corresponding physical address has been determined by the address translation circuitry.

To assist in maintaining coherency, then in one example implementation the stash request handing circuitry is arranged to defer storing the block of data associated with the stash request into the storage structure until a completion signal has been received from the coherency management circuitry to confirm that any of the multiple elements that may issue a subsequent request to access the block of data will access an up to date version of that block of data.

The timing at which the completion signal is issued by the coherency management circuitry may vary dependent on implementation. For example in some implementations it may be possible for the coherency management circuitry to issue the completion signal before all required coherency actions have necessarily been undertaken by the elements subjected to a snoop request by the coherency management circuitry, provided the coherency management circuitry is in a position to ensure that any subsequent access request received for the data in question by the coherency management circuitry will result in the most up to date version of the data being accessed. Receipt of the completion signal by the stash request handling circuitry effectively informs the stash request handling circuitry that it is now safe from a coherency point of view for the block of data associated with the stash request to be stored into the storage structure.

In one example implementation, the stash request is arranged to cause the associated block of data to be stored in the storage structure and marked as uniquely stored in that storage structure, and the coherency management circuitry is arranged to cause any copies of that block of data to be invalidated in any other local storage structures accessible to the elements coupled to the interconnect circuitry.

By such an approach, it can be ensured that any subsequent requests for access to the block of data can be serviced correctly, by ensuring that the access is performed using the copy of the block of data now stashed in the storage structure, since it is known that that storage structure is the only entity storing the block of data and that it stores the most up to date version of the data.

In one example implementation, the block of data that is to be written into the storage structure in response to the stash request is provided with the original stash request. However, in an alternative implementation the block of data itself may not be provided at the time the stash request is issued, and instead, once the completion signal has been received, the stash request handling circuitry may be arranged to issue a request via the interface to obtain the block of data from the generator of that stash request. At this point, there will typically not be a need for any further coherency actions to be taken, since it is known that the generator has the only valid copy of the data, and that data can hence merely be provided to the stash request handling circuitry for storage within the storage structure.

In addition to the flexibilities that the present technique can provide in terms of enabling the physical address mapping to be altered, without any need to change the behaviour of the generator of stash requests, further additional flexibilities can also be realised. For example, in one implementation the routing storage may be modifiable in order to change the element associated with a given target identifier, so as to alter the target element to which subsequent stash requests that identify the given target identifier are routed. Hence, for example, the processing element with the associated storage structure that is originally the target of stash requests can, at least when in certain modes of operation, cause the routing storage to be modified for a given target identifier that will be used in connection with such stash requests, so as to allow the actual physical target of the stash request to be changed without needing to modify the behaviour of the generator of stash requests. Such an ability to modify the routing storage could for example be given to the hypervisor, and/or to supervisor software running on the processing element.

This provides significant enhanced flexibility when handling stash requests. For example, the processing element could decide to offload the downstream processing of such generated stash data to another element in the system, for example a computational storage device. By changing the target identifier in the routing storage, this would cause subsequent stash requests to be routed to that computational storage device, such that the computational storage device would then be in charge of interpreting the given address provided with each subsequent stash request. Further, by changing the physical address mapping associated with the address space key, this can be arranged to cause those subsequent stash requests to target a physical address within that computational storage device. It should be noted that this change can be implemented without any need to change the behaviour of the generator of stash requests, and the redirection of those stash requests is entirely transparent to the generator of those stash requests.

There are a number of ways in which the generator of stash requests can be set up to perform such stashing operations. In one example implementation, the processing element is arranged to provide the generator of stash requests with a range of given addresses and the address space key to be used by the generator of stash requests when generating stash requests targeting the processing element's associated storage structure. The processing element can also provide the generator of stash requests with the target identifier to be used when issuing such stash requests. The timing at which this information is provided to the generator of stash requests can be varied dependent on implementation. However, in one example implementation, at the point in time the generator of stash requests is to be set up to perform tasks on behalf of the processing element, then the above information can be provided to the generator of stash requests for subsequent use when issuing those stash requests.

In one example implementation, the processing element is arranged to issue normal access requests to memory via the interface to the interconnect circuitry. Hence, it will be seen that in such implementations the stash requests flow through the interface in the opposite direction to traditional access requests. In particular, traditional access requests typically target memory, and are issued by a processing element through its associated interface to the interconnect circuitry for onward propagation to memory. In contrast, stash requests are received by the interconnect circuitry from a source processing element (the earlier-mentioned generator of stash requests), and then routed through the interconnect circuitry to an interface associated with a target processing element, for processing by stash request handling circuitry associated with that target processing element in order to cause the stash data to be stored within the associated storage structure of that target processing element.

As mentioned earlier, the associated storage structure into which stash data is stored can take a variety of forms. For instance, it could in one example implementation be a cache, and in such instances it will be understood that the location within the cache at which the data is stored (for example the set within the cache in the example of a set associative cache) may be dependent on the physical address. However, it is not a requirement that the associated storage structure is a cache, and hence for example in another implementation the associated storage structure may be a memory mapped storage accessible to the processing element. For example, where the processing element being targeted by the stash requests is a CPU, it may have some local buffer storage with a unique range of physical addresses, and by appropriate specification of a given address range and address space key to be used by the generator of stash requests, the stash data can be caused to be stored within a range of physical addresses within such a buffer.

As another example use case, the above described technique may be employed within a non-uniform memory access (NUMA) architecture where multiple processors are provided that can be located in different NUMA nodes, each NUMA node having a portion of main memory. In such examples, the associated storage structure could be a portion of main memory that is in the same NUMA node as the processor being targeted by the stash requests, such an approach enabling for example stash requests to be used by a source processor to write data into NUMA memory of another NUMA node.

Particular examples will now be described with reference to the Figures.

FIG. 1 is a block diagram of a system in accordance with one example implementation. As shown in FIG. 1, a number of elements 10, 45, 60, 65, 70, 95, 100 are coupled together via interconnect circuitry 75. The elements can take a variety of forms, for example the processing devices 10, 45 shown in FIG. 1 (which could for example take the form of central processing units (CPUs)), the graphics processing unit (GPU) 60, one or more accelerator devices 65, a system memory management unit (SMMU), main memory 95 and a computational storage device 100. It will be appreciated that these are merely examples of elements that could be connected to the interconnect circuitry, and any other suitable elements could be provided.

The processing device 10, or indeed the processing device 45, are examples of an apparatus in which the techniques described herein may be employed. FIG. 1 shows in more detail some of the components provided within the processing device 10, and the processing device 45 may be similarly constructed. In particular, the processing device 10 may include a processing element 15, such as a processing pipeline, for performing data processing operations, for example in response to instructions fetched from memory 95. When performing such data processing operations, the processing element may have access to some general purpose registers 20 used to temporarily store the data manipulated by the processing element 15 when performing the data processing operations.

During performance of such data processing operations, the processing element 15 may issue memory access requests seeking to access instructions and/or data held in memory 95, and those memory access requests can be routed via a memory management unit (MMU) 32 used to perform address translation in respect of addresses specified by those access requests. In particular, the access requests issued by the processing element may not directly specify a physical address in memory 95 associated with the data that is being accessed, but instead may specify a virtual address or an intermediate physical address that need translating in order to identify a physical address in memory. By using such a technique, different address spaces can be allocated to different processes being executed by the processing device 10.

The MMU 32 may include address translation circuitry 25 for performing such address translation operations, and in the example illustrated in FIG. 1 such address translation is performed with reference to one or more page tables 99 provided in memory. As will be understood by those of ordinary skill in the art, multi-level address translation may be performed requiring a number of page tables to be accessed in order to translate a virtual address into a physical address, or indeed to translate an intermediate physical address into a physical address, and accordingly a number of different page tables may need to be accessed by the address translation circuitry 25. In order to speed up the address translation process, it is known to cache some of the page table descriptor information retrieved from the page tables 99 in memory, and in particular to store that descriptor information locally within a translation lookaside buffer (TLB) 30 which can be considered to form part of the MMU 32.

With regard to the information being accessed by the access requests issued by the processing element, it is known to provide one or more levels of cache that may be used to store a subset of the information held in memory 95, so as to improve the speed of access to that information. Of particular interest to the techniques described herein is the data accessed by the processing element 15 when performing its data processing operations, and one or more levels of data cache may be provided for storing a subset of the data held in memory 95. In FIG. 1, a cache 35 may hence be provided for storing a subset of that data.

As shown in FIG. 1, once the MMU 32 has determined the physical address associated with the address output by the processing element, then a lookup operation can be performed within the cache 35 to determine whether the data is present within the cache, and if so the data that is the subject of the access request can be accessed in the cache rather than needing to access main memory 95. However, in the event of a miss in the cache, the access request can be propagated via the interface 12 over the interconnect circuitry 75, for routing to the memory 95 via its associated interface 97.

As discussed earlier, the processing device 45 can be constructed in an identical manner, but for simplicity the internal detail of the processing device 45, other than the cache 50, have been omitted.

Various devices can be used as hardware accelerators to perform certain tasks on behalf of the processing device 10 or the processing device 45. One example is the GPU 60, which can be arranged to perform graphics processing operations on behalf of the processing devices 10, 45. However, other hardware accelerator devices can also be provided, illustrated generically by the accelerator device 65 in FIG. 1. It will be appreciated that various different types of accelerator device can be provided, for example a digital signal processor, a cryptographic accelerator, etc.

For access requests issued by some components in the system, those components may have their own local address translation circuitry, such as for example is the case illustrated in FIG. 1 in respect of the processing device 10 which has its own MMU 32. However, other devices may make use of a system MMU 70 that be connected to the interconnect circuitry. Hence, for requests issued by the accelerator device 65, the system MMU 70 may be used to perform the required address translation to identify the physical addresses being accessed. The GPU 60 may also make use of the system MMU 70 for such purposes. However, alternatively, a hardware accelerator device such as the GPU 60 may also have its own internal MMU 62, with that MMU being used in combination with the system MMU 70 to perform address translation on behalf of the GPU. For example, the GPU may use a multi-stage address translation process, each stage including multiple levels, and in this instance the stage one address translation may be performed by the MMU 62 of the GPU 60, in order to convert a virtual address into an intermediate physical address, and the system MMU 70 may then be used to perform a stage two address translation in order to translate the intermediate physical address into a final physical address within memory 95.

Another example type of device that can be connected to the interconnect circuitry 75 is the computational storage device 100. This essentially can be considered as providing an area of non-volatile storage 105 (which may form memory mapped storage having a certain physical address range within the overall memory physical address range) along with some associated computational processing circuitry that can perform certain specific operations in respect of the data stored within the non-volatile storage 105.

As shown in FIG. 1, the interconnect circuitry 75 may include routing storage 80 that can be used to associate each of the multiple elements connected to the interconnect circuitry 75 with an associated target identifier. In the example illustrated in FIG. 1, it can be seen that each of the elements 10, 45, 60, 65, 70, 95 and 100 have associated interface blocks 12, 47, 62, 67, 72, 97 and 102 via which those elements are connected to the interconnect circuitry, and hence the routing storage can identify an associated target identifier for each of those interface blocks. When the elements issue requests to the interconnect circuitry, they can specify the associated target identifier, and, with reference to the routing storage 80, the interconnect circuitry 75 can then route the request to the appropriate entity.

In systems where one or more of the elements have local cache structures in which copies of the data held in memory can be stored, then the interconnect circuitry can also be provided with coherency management circuitry 85 for maintaining the coherency of the data, and in particular to maintain the coherency of any cacheable data held in memory. Any of a number of known cache coherency protocols can be implemented by the coherency management circuitry in order to maintain the coherency of the data, in order to ensure that when any element requests access to data within a cacheable region of memory, that element will access the most up to date version of the data. As shown by the dotted box 90 in FIG. 1, in addition to the caches provided in association with one or more of the elements connected to the interconnect, a system level cache 90 may also be provided, which can be considered to form one of the components provided by the interconnect circuitry, and typically can be associated with the coherency management circuitry 85, the coherency management circuitry also maintaining coherency with respect to the data stored within such a system cache.

In accordance with the techniques described herein, one or more of the elements connected to the interconnect circuitry can act as a generator of stash requests. In contrast to normal memory access requests that target memory, a stash request instead identifies a particular target element coupled to the interconnect circuitry to which that stash request is directed, and causes the data specified by the stash request to be stored directly within an associated storage structure of that targeted element. Whilst the associated storage structure to which stash requests are directed can take a variety of forms, for the purposes of the following description it will be assumed that the associated storage structure is a cache within one of the processing elements.

Hence, by way of specific example, the GPU 60, or indeed one of the other accelerator devices 65, may be arranged to perform a number of data processing tasks on behalf of the processing device 10, in order to generate data that is then subsequently used by the processing device 10. Whilst that data could be written to memory 95 via one or more standard memory access requests, by using stash requests the GPU 60 or other accelerator device 65 can instead cause the generated data to be written directly into the cache 35 of the processing device 10, thereby improving performance by avoiding the latency and/or energy consumption that would be associated with the processing device 10 having to subsequently access the data from memory 95.

Typically, such a stash request would identify a physical address associated with the data being written, and provide a target identifier that can then be looked up within the routing storage 80 in order to identify the target for the stash request. Hence, if the GPU 60 were issuing a stash request targeting the cache 35 within the processing device 10, it could provide a target identifier that identified the processing device 10 and/or the cache 35, and also provide a physical address that can then be used by the processing device 10 to identify where within the cache the data should be written. In particular, it will be appreciated that such a physical address could be used to identify a set within the cache, with the stash data then being written into an available cache line within the identified set.

As shown in FIG. 1, the processing device 10, or indeed any recipient of stash requests, may be provided with stash request handling circuitry 40 for handling stash requests received from the interconnect circuitry, to cause the data identified by those stash requests to be written into the associated storage structure, such as the cache 35. In accordance with the techniques described herein, the generators of stash requests, such as the GPU 60 or the accelerator device 65, do not issue a physical address, but instead provide a given address that needs translating into a corresponding physical address in memory. The given address can take a variety of forms, but could for example be a virtual address or an intermediate physical address.

Further, to enable the recipient of the stash request to process the stash request correctly, the stash request may also identify an address space key that can be used by the recipient processing device to enable an appropriate address translation to be performed. The address space key can take a variety of forms, and may for example comprise one or more of a virtual machine identifier, an address space identifier, or a process address space identifier (PASID). For the purposes of the following discussion, it will be assumed that a PASID is used.

By using such an address space key, this can enable the stash request handling circuitry 40 to employ the services of standard address translation circuitry, such as the address translation circuitry 25 within the MMU 32, to perform the address translation. In particular, by providing the address space key to the address translation circuitry 25, that address translation circuitry can then use the key to identify which page tables are to be used to perform the address translation. For example, the address space key can be used to identify a base address for a first level page table required to perform the address translation. Hence, when the stash request handling circuitry 40 receives a stash request of the above described type, it can then issue a signal to the MMU 32 to cause the address translation circuitry 25 to perform an address translation of the given address provided with the stash request (for the purposes of the following discussion it will be assumed that that given address is a virtual address), where that address translation is performed in dependence on the address space key identified by the stash request, which can also be provided by the stash request handling circuitry 40 to the MMU 32.

Once the physical address has been determined by the address translation circuitry, then the stash request handling circuitry can cause the block of data associated with the stash request to be stored at a location within the associated storage structure (for example the cache 35) associated with the physical address.

By such an approach, this enables the handling of stash requests to be virtualised, providing a great deal of flexibility as to how stash requests can be handled, without needing to modify the behaviour of the generator of those stash requests. In particular, at the time a processing device such as the processing device 10 sets up a hardware accelerator such as the GPU 60 to perform some tasks on its behalf, it can provide the GPU with a suitable virtual address range, and an address space key to be used when issuing stash requests. In addition, it can provide the target identifier to be issued with those stash requests, so as to ensure that those stash requests are routed to the appropriate element, for example back to the processing device 10 to enable the stash data to be stored within the cache 35.

However, because the stash requests now no longer use physical addresses, this enables the processing device to make certain changes to the address mapping used in respect of stash requests issued using the specified virtual address range and address space key, so as to enable for example the destination of those stash requests to be altered, without needing to inform the GPU or make any changes to the way in which stash requests are generated by the GPU. More details of the flexibility afforded by such an approach will be discussed later with reference to FIGS. 4A and 4B.

Figure 2:
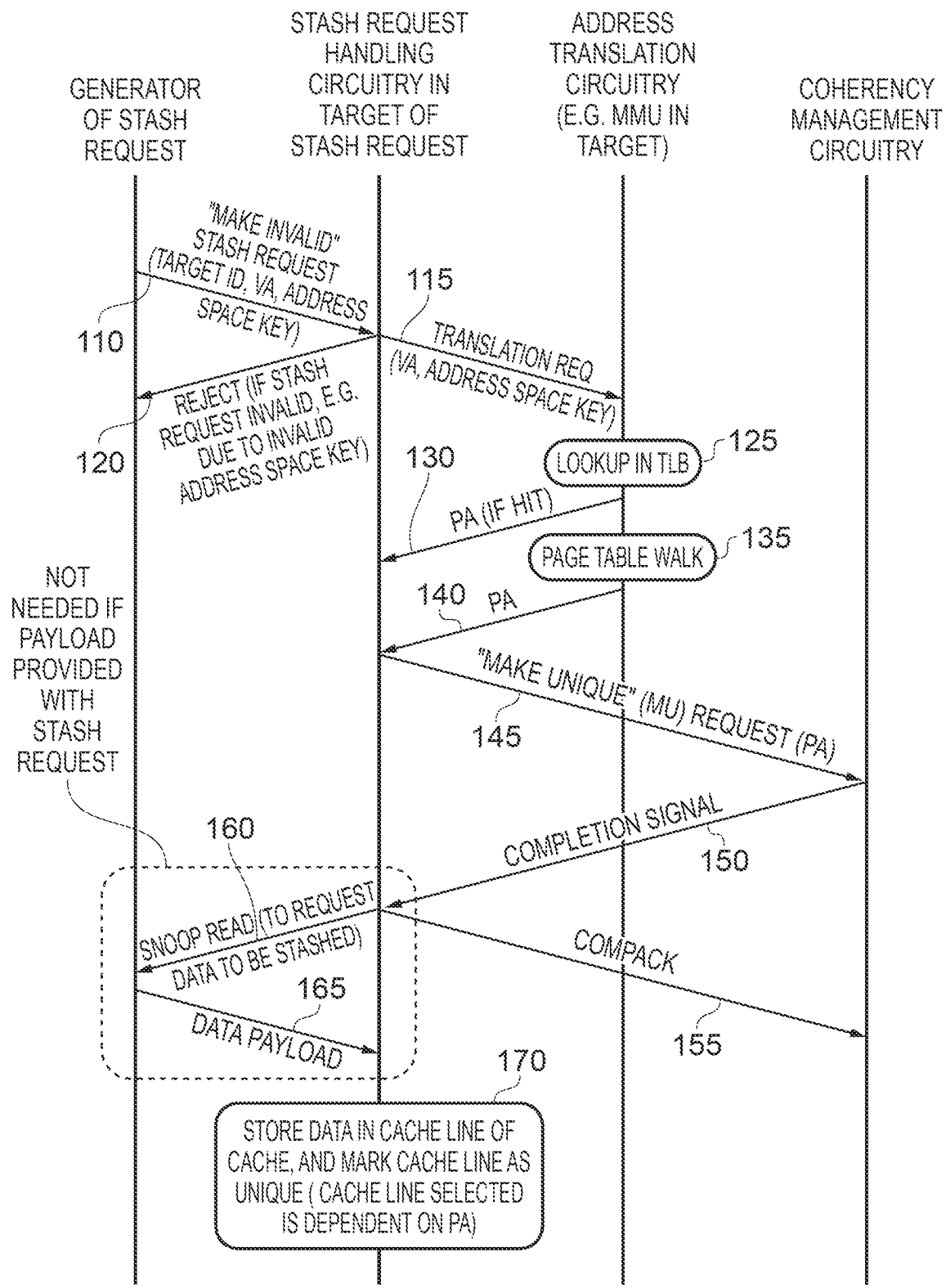
FIG. 2 illustrates the interaction between a number of components of the system in order to handle a stash request, in accordance with one example arrangement.
Figure 3:
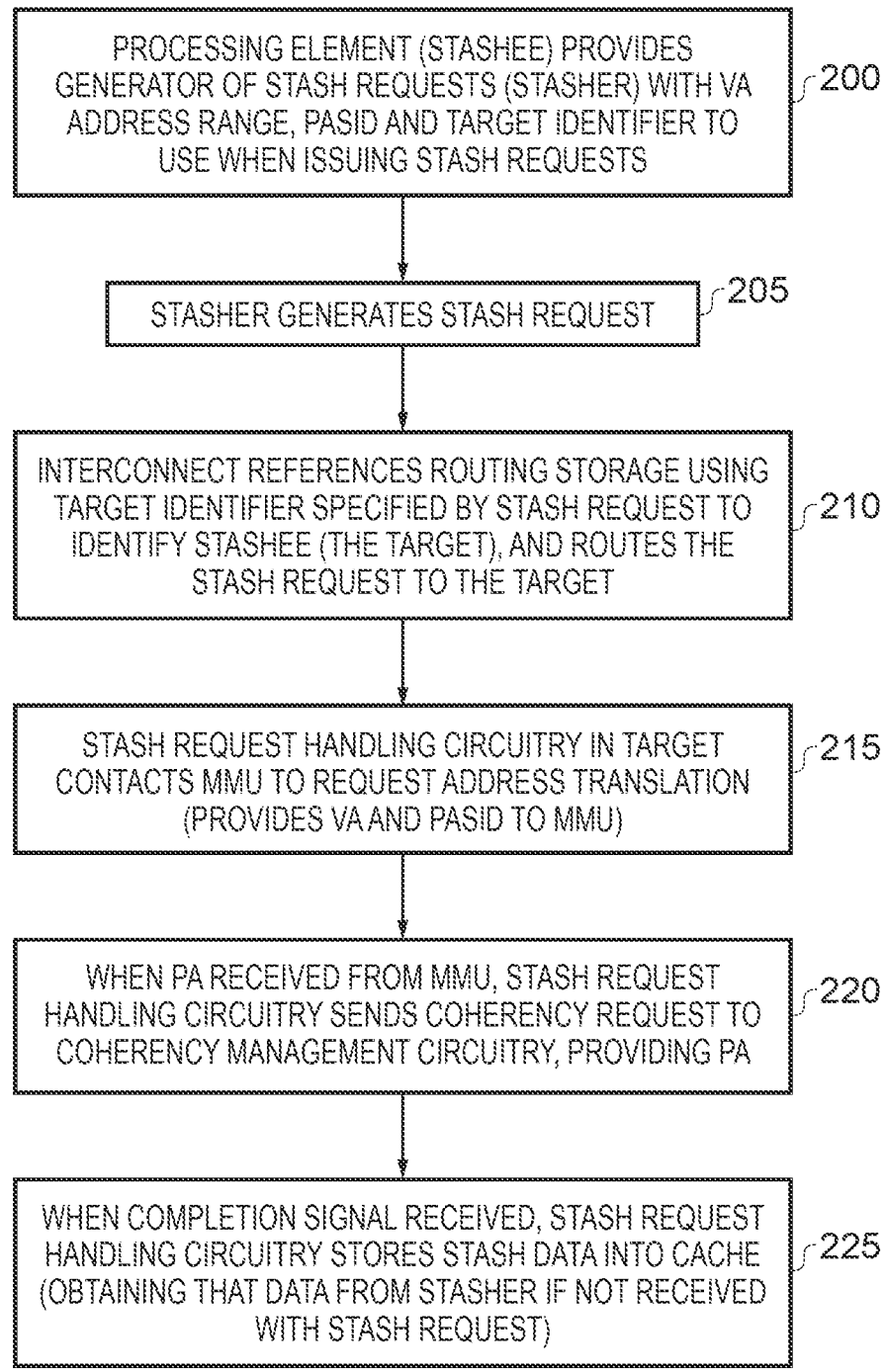
FIG. 3 is a flow diagram illustrating the handling of a stash request in accordance with one example arrangement.

FIG. 2 is a diagram illustrating communications between various elements within the system of FIG. 1 when handling stash requests, and FIG. 3 is an associated flow diagram illustrating the steps performed when handling stash requests. Considering first FIG. 3, then at step 200 the processing element that is to be the recipient of stash requests (which may also be referred to herein as the stashee) may provide to the device that it is requesting to perform operations on its behalf, in this case the device that will generate stash requests (and hence can be referred to herein as the stasher), a suitable virtual address range, a PASID to use as the address space key, and a target identifier to be used when issuing stash requests.

Once the generator of stash requests has been set up in this manner, then it can subsequently perform data processing operations on behalf of the stashee, and as indicated by step 205 may then subsequently generate a stash request. This is shown in FIG. 2 by the line 110 passing from the generator of the stash request to the stash request handling circuitry in the target device, which may for example be the stash request handling circuitry 40 shown in FIG. 1. As discussed earlier, the interconnect circuitry will make reference to the routing storage 80 in order to determine how to route the stash request, and in particular to determine the target of the stash request, with the stash request then being routed through the interconnect and via the appropriate interface to the target device. This is indicated by step 210 in FIG. 3.

The stash request handling circuitry 40 may perform some preliminary analysis of the received stash request, and as shown by the arrow 120 in FIG. 2 may reject the stash request in certain situations. For example, the stash request handling circuitry 40 may be able to determine that the stash request is invalid, for example due to an invalid address space key (in the example of FIG. 2 an invalid PASID value) being specified.

However, assuming any such initial checks are passed, then as indicated by step 215 of FIG. 3, and by the arrow 115 in FIG. 2, the stash request handling circuitry in the target device may contact an associated MMU to request that an address translation is performed in respect of the virtual address specified by the stash request. As part of the information passed to the MMU, the address space key will also be provided as well as the virtual address.

As indicated by the bubble 125 in FIG. 2, the MMU can perform a lookup in a local TLB in order to determine whether the required address translation information is available for the virtual address and address space key provided. If so, then a hit occurs within the TLB, and the required physical address can be returned to the stash request handling circuitry, as indicated by the arrow 130 in FIG. 2. Alternatively, if a hit is not detected in the TLB, or the hit in the TLB only provides a partial address translation, then a page table walk process 135 can be initiated as shown in FIG. 2, in order to access one or more page tables 99 within the memory 95 in order to retrieve the required address translation information. That retrieved information may then be stored within the TLB 30, but in addition will enable the required physical address to be output to the stash request handling circuitry, as indicated by the arrow 140.

As indicated by step 220 in FIG. 3, when the physical address is received from the MMU, the stash request handling circuitry can send a coherency request to the coherency management circuitry 85, providing the physical address. The coherency action required to be performed by the coherency management circuitry will depend on the implementation, and on the type of stash request being performed. However, in the example of FIG. 2 it is assumed that the original stash request is a "make invalid" stash request, hence identifying that any caches storing a cached copy of the data for the physical address identified by the above address translation process should be invalidated, since the data that will be provided by the stash request will replace any previous version of that data, and accordingly any such cached copies will be out of date Hence, in such an example implementation, the coherency request issued from the stash request handling circuitry to the coherency management circuitry will be a make unique (MU) request, and will specify the physical address that has been determined with reference to the address translation circuitry, as shown by the arrow 145 in FIG. 2.

The coherency management circuitry will then handle the make unique request in the standard manner, and hence for example may identify with reference to a snoop table which elements may potentially have cached copies of the data, and issue snoop requests to any such elements to cause their local cached copies of that data to be invalidated.

Once the coherency management circuitry 85 has taken steps sufficient to ensure that any subsequent access request issued to the interconnect circuitry for that data will be handled appropriately, and in particular will cause the most up to date version of the data to be accessed, then the coherency management circuitry 85 can issue a completion signal back to the stash request handling circuitry, as indicated by the arrow 150 in FIG. 2. As shown in FIG. 2, in the example implementation shown, a handshake mechanism is used in respect of the completion signal, and accordingly the stash request handling circuitry will issue an acknowledgement signal back to the coherency management circuitry to acknowledge receipt of the completion signal.

As indicated by step 225 in FIG. 3, when the completion signal is received, the stash request handling circuitry is then arranged to store the stash data into the cache. In one example implementation, the stash data, i.e. the data to be written in response to the stash request, may be provided as part of the original stash request. However, in an alternative implementation, as illustrated in FIG. 2, the data may not be provided with the original stash request, and instead, on receipt of the completion signal, the stash request handing circuitry may then issue a request to the generator of the stash request in order to request that that data is provided to it.

In one example implementation, such a request can be issued as a snoop read request to the generator of the stash requests, as indicated by the arrow 160 in FIG. 2. Typically, the generator of the stash request can then merely return the data payload to the stash request handling circuitry via the interconnect, as indicated by the arrow 165, without the need for any further coherency management operations to be initiated. In particular, the generator of the stash request (the stasher) will know that the data it has generated is unique, and indeed may be held within the stasher as non-coherent data, for example within a source register. Further, it is known that the read request from the stash request handling circuitry will only have been issued once the completion signal has been received from the coherency management circuitry, and hence all the required coherency actions have been taken. However, if in other implementations it is considered appropriate to perform a further coherency check prior to providing the data payload to the stash request handling circuitry, then such a coherency operation could be initiated by the generator of the stash request sending a coherency request to the coherency management circuitry.

Once the data payload has been received, then as indicated by the bubble 170 in FIG. 2 the received data can be stored within an available cache line of the cache, and in particular within one of the available cache lines that is within a set of the cache identified using the physical address, for an implementation where the cache is a set associative cache. The cache line can also be marked as unique, since it is known by virtue of the coherency actions that have been performed that the cache stores the only copy of the data. In particular, any other cached copies will already have been invalidated.

Figure 4A:
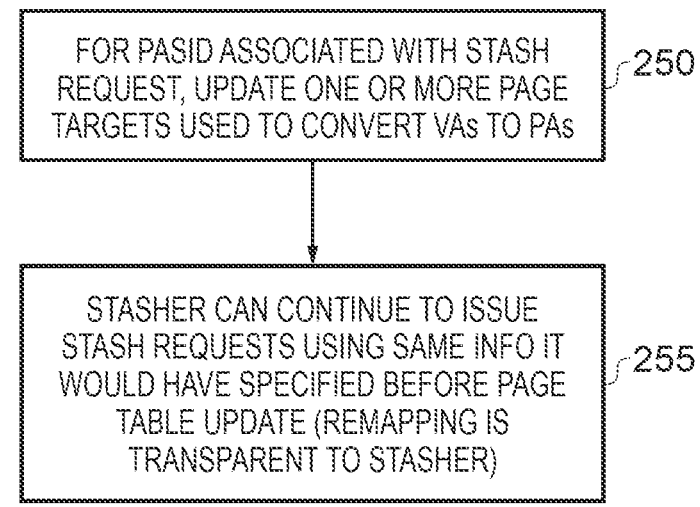
FIG. 4A is a flow diagram illustrating how an address space used for stashing may be remapped in accordance with one example arrangement.
Figure 4B:
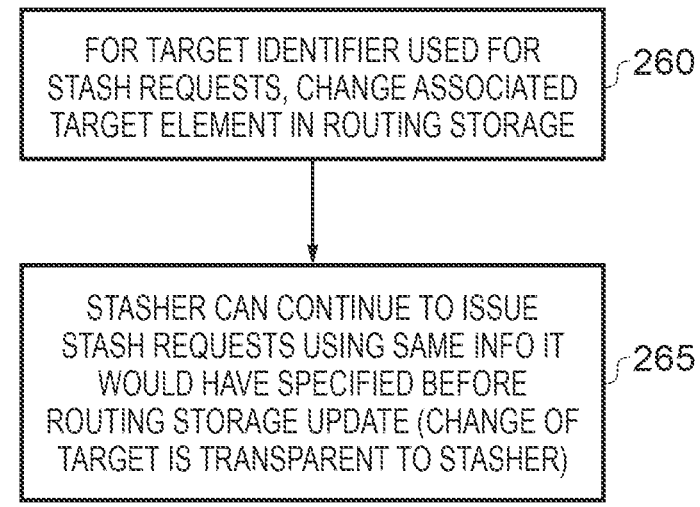
FIG. 4B illustrates how a target for stash requests may be altered in accordance with one example implementation.

FIGS. 4A and 4B illustrate some of the flexibility that can be realised as a result of virtualising stash requests in the manner discussed herein. As shown in FIG. 4A, it is for example possible to remap the physical address space to be used for stashing. In particular, the processing element that is to be the recipient of stash requests, and that has accordingly provided the virtual address range and PASID to be used by the stasher, can, at least when in certain modes of operation, update one or more pages tables used to convert virtual addresses for that PASID into physical addresses. This may for example be possible by the processing element when operating in a certain privileged state, for example at a hypervisor or supervisor level of operation.

As indicated by step 255 the stasher can then continue to issue stash requests using the same information that it would have specified before any such page table update, and the remapping that has been performed by virtue of step 250 is entirely transparent to the stasher.

Such remapping can be used in a variety of different ways. For example, within the cache based example, by changing the physical address mapping this may alter which physical data array or storage device of the cache is used to hold the stashed data. Further, if the stashee has some local memory mapped address space, and hence for example is able to establish one or more local buffers in memory mapped address space, such an approach enables the stashee to create a new buffer into which subsequent stashed data is directed.

FIG. 4B is a flow diagram illustrating other adjustments that could be made to the handling of stash requests without needing to make any changes to the operation of the stasher. As indicated by step 260, for one or more target identifiers that are used for stash requests, the associated target element can be changed within the routing storage 80 referenced by the interconnect circuitry, in order to change the element that receives any subsequent stash requests issued using that target identifier. This can be useful in a number of situations. For example, it could enable the processing device 10 to decide to offload certain data processing tasks to the processing device 45, and merely by changing the mapping in the routing storage between the target identifier and the actual element being targeted, any subsequent stash request will automatically be redirected to the processing device 45, for example to allow the stash data to be stored in its local cache 50. This can be performed without needing to make any changes to the operation of the stasher, and indeed the stasher continues to generate stash requests using the originally provided information, as indicated by step 265.

As a yet further example, by combining the mechanisms of FIGS. 4A and 4B, it is possible to change both the physical address space associated with stash requests and the actual target element to which those stash requests are directed. Purely by way of illustrative example, the GPU 60 may originally be set up to perform stash requests on behalf of the processing device 10, but the processing device 10 may decide subsequently that it wishes to offload certain subsequent processing tasks in respect of the stashed data to the computational storage device 100. To achieve this, the processing device 10 could cause the routing storage to be updated so that the target identifier used by stash requests issued by the GPU now maps to the computational storage device 100. Further it could then change the mapping of the relevant page tables associated with the PASID value used by the GPU when issuing stash requests, so as to identify a physical address space within the non-volatile storage 105.

Hence, it will be appreciated that the techniques described herein provide significantly enhanced flexibility in respect of the handling of stash requests, in particular providing a virtualised mechanism for the handling of stash requests that enables certain underlying changes to both the target element and/or physical address space used for stash requests to be made without needing to adjust the operation of the stasher. Indeed, any such changes can be made in a manner that is entirely transparent to the stasher's activities.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:
1. An apparatus comprising:
    a processing element with an associated storage structure used to store data for access by the processing element;

stash request handling circuitry, responsive to a stash request targeting the storage structure being received from the interconnect circuitry, to cause a block of data associated with the stash request to be stored within the storage structure, wherein the stash request identifies a given address that needs translating into a corresponding physical address in memory, and also identifies an address space key; and address translation circuitry to convert, in response to a translation request sent by the stash request handling circuitry following receipt of the stash request from the interconnect circuitry, the given address identified by the stash request into the corresponding physical address by performing an address translation that is dependent on the address space key identified by the stash request;

wherein the stash request handling circuitry is responsive to the corresponding physical address determined by the address translation circuitry to cause the block of data to be stored at a location within the storage structure associated with the physical address.

2. The apparatus as claimed in claim 1, wherein the address translation circuitry is arranged to determine the address translation with reference to one or more page tables in memory, and the address space key is used by the address translation circuitry to identify at least one page table.

3. The apparatus as claimed in claim 1, wherein the processing element, in at least one mode of operation, is enabled to modify the address translation performed by the address translation circuitry in dependence on the address space key, so as to alter how given addresses identified by subsequent stash requests that identify the address space key are translated into corresponding physical addresses.

4. The apparatus as claimed in claim 1, further comprising:

the interconnect circuitry to interconnect multiple elements that are coupled to the interconnect circuitry, the multiple elements including a generator of stash requests;

wherein:

each stash request further provides a target identifier;

the interconnect circuitry comprises routing storage to associate each of the multiple elements with an associated target identifier; and the interconnect circuitry is responsive to receipt of each stash request produced by the generator of stash requests to reference the routing storage in order to determine a target element to which that stash request is to be routed by the interconnect circuitry.

5. The apparatus as claimed in claim 4, wherein the interconnect circuitry has coherency management circuitry to maintain coherency of data accessible by the multiple elements, and the stash request handling circuitry is arranged to trigger the coherency management circuitry to perform a coherency action in order to ensure coherency for the block of data associated with the stash request.

6. The apparatus as claimed in claim 5, wherein the stash request handling circuitry is arranged to trigger the coherency management circuitry to perform the coherency action once the corresponding physical address has been determined by the address translation circuitry.

7. An apparatus comprising:

a processing element with an associated storage structure used to store data for access by the processing element;

stash request handling circuitry, responsive to a stash request targeting the storage structure being received from the interconnect circuitry, to cause a block of data associated with the stash request to be stored within the storage structure, wherein the stash request identifies a given address that needs translating into a corresponding physical address in memory, and also identifies an address space key; and address translation circuitry to convert the given address identified by the stash request into the corresponding physical address by performing an address translation that is dependent on the address space key identified by the stash request;

wherein the stash request handling circuitry is responsive to the corresponding physical address determined by the address translation circuitry to cause the block of data to be stored at a location within the storage structure associated with the physical address;

further comprising the interconnect circuitry to interconnect multiple elements that are coupled to the interconnect circuitry, the multiple elements including a generator of stash requests;

wherein:

each stash request further provides a target identifier;

the interconnect circuitry comprises routing storage to associate each of the multiple elements with an associated target identifier; and the interconnect circuitry is responsive to receipt of each stash request produced by the generator of stash requests to reference the routing storage in order to determine a target element to which that stash request is to be routed by the interconnect circuitry;

the interconnect circuitry has coherency management circuitry to maintain coherency of data accessible by the multiple elements, and the stash request handling circuitry is arranged to trigger the coherency management circuitry to perform a coherency action in order to ensure coherency for the block of data associated with the stash request; and, the stash request handling circuitry is arranged to defer storing the block of data associated with stash request into the storage structure until a completion signal has been received from the coherency management circuitry to confirm that any of the multiple elements that may issue a subsequent request to access the block of data will access an up to date version of that block of data.

8. The apparatus as claimed in claim 5, wherein the stash request is arranged to cause the associated block of data to be stored in the storage structure and marked as uniquely stored in that storage structure, and the coherency management circuitry is arranged to cause any copies of that block of data to be invalidated in any other storage structures accessible to the elements coupled to the interconnect circuitry.

9. The apparatus as claimed in claim 7, wherein, once the completion signal has been received, the stash request handling circuitry is arranged to issue a request to obtain the block of data from the generator of that stash request.

10. The apparatus as claimed in claim 4, wherein the routing storage is modifiable in order to change the element associated with a given target identifier, so as to alter the target element to which subsequent stash requests that identify the given target identifier are routed.

11. The apparatus as claimed in claim 4, wherein the processing element is arranged to provide the generator of stash requests with a range of given addresses and the address space key to be used by the generator of stash requests when generating stash requests targeting the processing element's associated storage structure.

12. The apparatus as claimed in claim 1, wherein the processing element is arranged to issue access requests to the memory to the interconnect circuitry.

13. The apparatus as claimed in claim 1, wherein the associated storage structure is a cache.

14. The apparatus as claimed in claim 1, wherein the associated storage structure is a memory mapped storage accessible to the processing element.

15. The apparatus as claimed in claim 1, wherein the given address is a virtual address.

16. A method of handling stash requests, comprising:
provniding a processing element with an associated storage structure used to store data for access by the processing element;
employing stash request handling circuitry, responsive to a stash request targeting the storage structure being received from interconnect circuitry, to cause a block of data associated with the stash request to be stored within the storage structure, wherein the stash request identifies a given address that needs translating into a corresponding physical address in memory, and also identifies an address space key;
employing address translation circuitry to convert, in response to a translation request sent by the stash request handling circuitry following receipt of the stash request from the interconnect circuitry, the given address identified by the stash request into the corresponding physical address by performing an address translation that is dependent on the address space key identified by the stash request; and
in response to the corresponding physical address being determined by the address translation circuitry, causing the block of data to be stored at a location within the storage structure associated with the physical address.

\* \* \* \* \*